US012454955B1

(12) United States Patent
Schulman et al.

(10) Patent No.: US 12,454,955 B1
(45) Date of Patent: Oct. 28, 2025

(54) ENHANCED DUAL FLOAT SWITCH WITH ILLUMINATION AND SWITCH DISCRIMINATION

(71) Applicant: Glentronics, Inc., Lincolnshire, IL (US)

(72) Inventors: Alan Schulman, Lincolnshire, IL (US); Ilya Ostashev, Lincolnshire, IL (US)

(73) Assignee: Glentronics, Inc., Lincolnshire, IL (US)

( * ) Notice: Subject to any disclaimer, the term of this patent is extended or adjusted under 35 U.S.C. 154(b) by 0 days.

(21) Appl. No.: 18/904,391

(22) Filed: Oct. 2, 2024

(51) Int. Cl.
*F04D 15/00* (2006.01)
*H01H 35/18* (2006.01)
*H05B 45/10* (2020.01)
*F04D 13/08* (2006.01)

(52) U.S. Cl.
CPC ..... *F04D 15/0088* (2013.01); *F04D 15/0077* (2013.01); *H01H 35/18* (2013.01); *H05B 45/10* (2020.01); *F04D 13/08* (2013.01)

(58) Field of Classification Search
CPC ............ F04D 15/0088; F04D 15/0077; F04D 15/0218; F04D 13/08; F04D 13/086; H05B 45/10; H01H 35/18; H01H 9/161; F21V 31/005; F21V 33/00; F21W 2131/40; F21W 2131/401; A01K 85/015
USPC ....................... 417/63, 36–41, 572
See application file for complete search history.

(56) References Cited

U.S. PATENT DOCUMENTS

| 8,523,532 | B1* | 9/2013 | Pohler ............... | E03F 5/00 417/40 |
| 2006/0176000 | A1* | 8/2006 | Schulman ............ | F04D 15/0218 318/482 |
| 2012/0251333 | A1* | 10/2012 | Irwin ................. | E03F 5/22 417/1 |
| 2015/0143892 | A1* | 5/2015 | Cummings ......... | F04D 15/0088 73/168 |
| 2017/0175746 | A1* | 6/2017 | Mayleben .......... | F04D 13/086 |
| 2019/0353156 | A1* | 11/2019 | Ward .................. | F04B 49/065 |

* cited by examiner

*Primary Examiner* — Mark A Laurenzi
*Assistant Examiner* — Kelsey L Stanek
(74) *Attorney, Agent, or Firm* — ICE MILLER LLP; Justin D. Swindells

(57) ABSTRACT

The disclosure herein discloses a sump pump system for illuminating a sump pump well. The sump pump system comprises a sump pump switch assembly having a float housing, a first float switch and second float switch, and an illumination circuit. The illumination circuit is encased in a waterproof body and includes a first illumination sub-circuit and second illumination sub-circuit. The first illumination sub-circuit includes a first light emitting diode configured to illuminate a wall of the sump pump well in response to the first float switch being closed. The second illumination sub-circuit includes a second light emitting diode configured to illuminate the wall of the sump pump well in response to the second float switch being closed.

7 Claims, 9 Drawing Sheets

ENHANCED DUAL FLOAT SWITCH WITH ILLUMINATION AND SWITCH DISCRIMINATION

BACKGROUND OF THE INVENTION

A sump pump is a device used to remove a fluid from a sump basin, typically located in the basement or crawl space of a home. The primary function of a sump pump system is to prevent flooding and water damage by managing and removing excess fluid that could otherwise accumulate in low-lying areas of the home. The system is essential in areas where the water table is high, or where heavy rain or drainage issues can cause fluid to collect around or beneath the foundation. Proper installation and maintenance of the sump pump system are crucial to ensuring its reliable operation.

A typical sump pump system consists of a pump, a sump basin, and associated plumbing for relocating the fluid from the sump basin to a different location. The sump basin is a pit that collects a fluid, either from natural groundwater seepage or from drainage systems designed to direct the fluid away from the foundation of the building. Sump pump systems typically employ pumps that are electrically operated to activate when a fluid level in the sump basin reaches a predetermined height. This activation is typically controlled by a float switch, which rises with the fluid level. Once the switch triggers the pump, it begins to move fluids from the basin through discharge pipes, directing the fluids away from the home to a storm drain, dry well, or other designated drainage area.

However, issues arise when sump pump systems fail. Common issues with sump pump systems include power failures during storms and problems with the float switch. Occasionally, the float switch can become stuck or fail to operate correctly due to debris within the sump basin clogging the float. These issues can cause the pump to not turn on leading to failure of the sump pump system. Often times homeowners are unaware of a sump pump system failure, resulting in flooding and damage to the home.

Accordingly, there is a need for a reliable system that can visually indicate the operational status of the sump pump system to a user.

SUMMARY OF THE INVENTION

In one example, the disclosure includes a sump pump system comprising a sump pump switch assembly having a float housing, a first float switch and second float switch, and an illumination circuit for illuminating the sump pump well. The illumination circuit is encased in a waterproof body and is configured to be coupled to the float housing. The illumination circuit includes a first illumination sub-circuit and second illumination sub-circuit. The first illumination sub-circuit includes a first light emitting diode configured to illuminate a wall of the sump pump well in response to the first float switch being closed. The second illumination sub-circuit includes a second light emitting diode configured to illuminate the wall of the sump pump well in response to the second float switch being closed.

In one example, the disclosure includes a method for visually indicating the operational status of a sump pump system to a user. The method comprises submerging a float housing of a sump pump system in a fluid in response to a sump pump well being filled with the fluid, illuminating a wall of the sump pump well in response to a first float switch being closed, and illuminating a wall of the sump pump well in response to a second float switch being closed.

In one example, the disclosure includes a method for visually indicating the operational status of a sump pump system to a user. The method comprises submerging a float housing of the sump pump system in response to a sump pump well being filled with a fluid to a predetermined level, illuminating a wall of the sump pump well via a second light source coupled to the second float switch, determining, via a visual inspection by the user, that the first float switch of the sump pump system is inoperable, and determining, via the visual inspection by the user, that the second float switch of the sump pump system is operable.

DETAILED DESCRIPTION

The descriptions, illustrations, and examples in the present disclosure are given by illustration only and are by no means a limitation. The descriptions, illustrations, and examples are described and discussed in such a way that one skilled in the art may understand and appreciate the principles and practices of the disclosure. Various modifications such as substitutions, additional, rearrangements, may be made that remain potential applications of the disclosure process.

The disclosure herein includes a system and method for providing, to a user, a visual indication of the operational status of the sump pump system. By also illuminating the sump pump well, the system described herein facilitates easier inspection, maintenance, and repairs of the sump pump system, ensuring effective protection against basement flooding. In one example, the illumination system includes an illumination circuit. The illumination circuit includes a plurality of light sources communicatively coupled to a two-float assembly disposed within a float housing. Each float includes a separate float switch that activates the sump pump when the float is submerged in a fluid. For example, a first float, comprising a first float switch, is responsible for initiating the pump when a fluid level in the sump pump well rises to a first predetermined point. As a fluid accumulates, the first float rises, and upon reaching a certain height, it triggers the pump to start removing the fluid from the sump pit. The pump continues to operate until the fluid level drops and the first float descends, turning off the pump. A second float, comprising a second float switch, acts as a backup (i.e., a redundant float switch in case the first float switch fails). If the first float fails to activate the pump due to mechanical failure or obstruction, the fluid level will continue to rise until it reaches the second float. This secondary float then activates the pump, ensuring that fluid is removed even if the primary float malfunctions. This redundancy is crucial, as it significantly reduces the risk of sump pump failure and potential basement flooding.

In one example, the illumination circuit includes a first light source coupled to the first float switch and a second light source coupled to the second float switch. The first light source is illuminated when the sump pump is operational, indicating that the pump is working. The second light source is illuminated when the sump pump is not operational, indicating that the pump is not working. The second light source also illuminates the interior of the sump pump well, providing visibility to the user of the pump well and pump components when the pump is not functioning.

Figure 1:
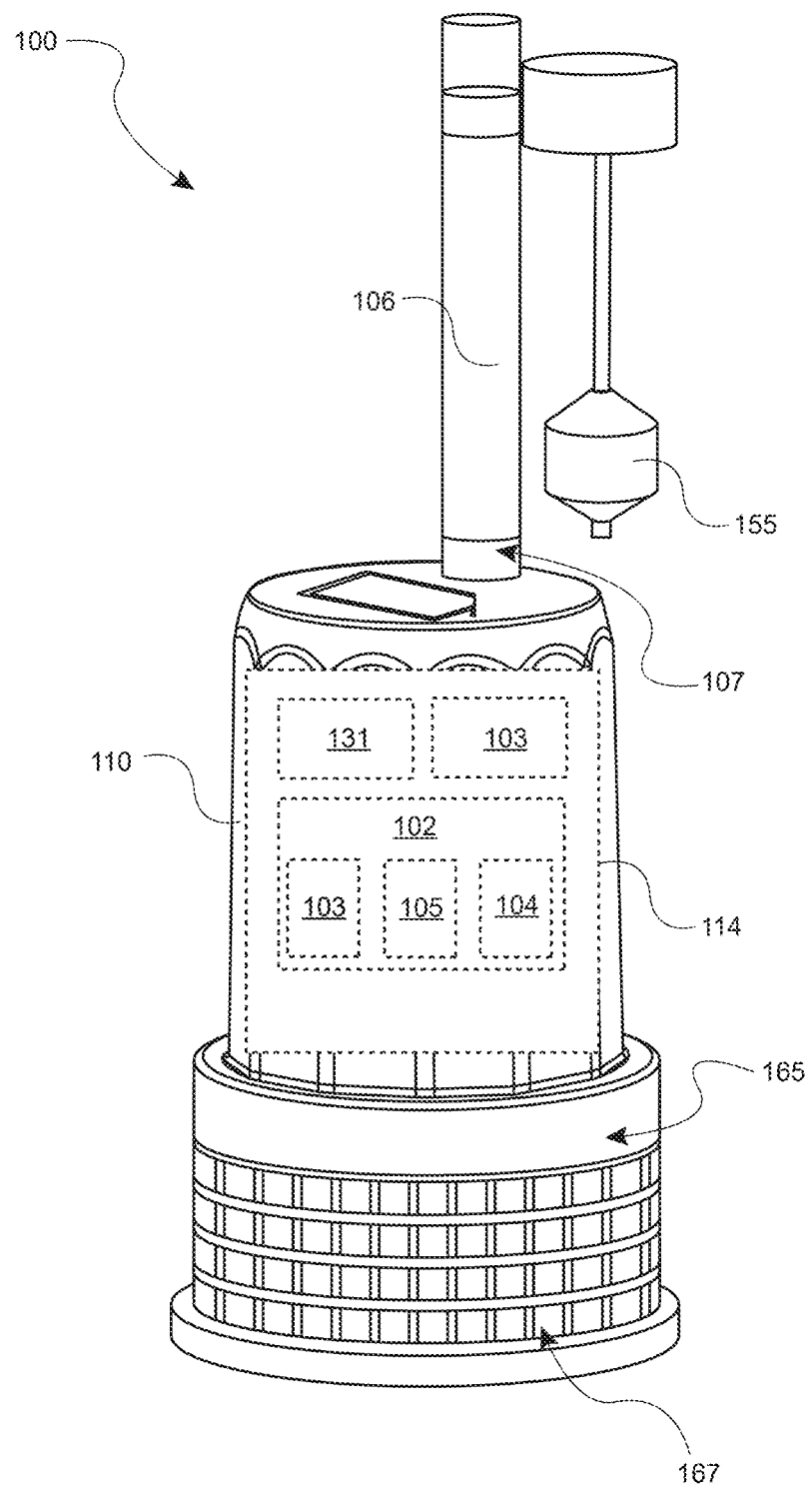
FIG. 1 is an illustration of a conventional sump pump system, according to one example.

FIG. 1 illustrates a conventional sump pump system 100. A conventional sump pump system 100 directs fluid away from a building by carrying a fluid, via a discharge line 106, from a reservoir (e.g., a sump well) to an external discharge point. Conventional sump pump systems 100 often have issues with successfully discharging fluids. For example, conventional sump pumps 100 are known to have issues with clogging when debris gets directed into the pump, causing blockages which obstruct the sump pump system 100, rendering the system inoperative.

The conventional sump pump 100 illustrated in FIG. 1 includes a discharge line 106, a check valve 107, a sump pump housing 110, and base 165. The sump pump housing 110 encloses internal pump components 114 and provides structural support to the sump pump system 100. Examples of internal pump components 114 include a power source 131, a control system 103, and a pump 102. Pump 102 includes a pump motor 104 and other critical components (e.g., impeller 103, diffuser 105, etc.). The sump pump housing 110 can be made of high-density polyethylene (HDPE), polypropylene, plastics composites (e.g., glass-reinforced nylon, carbon fiber-reinforced polymer, etc.), and fiber-reinforced polymers (e.g., carbon fiber). The shape of housing 110 can vary, provided it is sufficient to encapsulate the pump components. For example, the shape of sump pump housing 110 can be cylindrical, rectangular, conical, oval or trapezoidal.

The sump pump housing 110 includes a base 165 that supports the sump pump system 100 and covers an inlet to the internal components 114. The base 165 typically includes features that prevent debris from entering the pump. For example, as shown in FIG. 1, the base 165 includes grates 167 (or alternatively screens) that cover the inlet to the pump, preventing large particles from clogging the pump mechanism thereby helping maintain the functionality of the sump pump. Like the sump pump housing 110, the base 165 can be made of high-density polyethylene (HDPE), polypropylene, plastics composites (e.g., glass-reinforced nylon, carbon fiber-reinforced polymer, etc.), and fiber-reinforced polymers (e.g., carbon fiber).

The pump 102 includes an impeller 103, a diffuser 104 and a motor 105. The motor 105 is the primary component of a submersible pump and is responsible for driving the impeller 103. The motor 105 is typically a sealed, waterproof unit designed to operate underwater. The impeller 103 is a rotating component that consists of curved blades or vanes. Its main function is to create centrifugal force, which propels the fluid from the inlet to the outlet of the pump, generating the pumping action. The impeller 103 includes fins that are designed to create turbulence in the fluid, enhancing the pumping efficiency. The fins on the impeller increase the fluid's velocity as it passes through the pump, contributing to the creation of centrifugal force. The fins on the impeller also help to break up debris and prevent clogging within the pump. This ensures that the sump pump can handle small particles and maintain its pumping efficiency over time. The diffuser 104 is a stationary component that surrounds the impeller and includes a series of channels or vanes that guide the fluid flow. These channels are designed to gradually expand the flow area, converting the high-velocity, low-pressure flow from the impeller into a high-pressure discharge flow.

The power source 131 supplies the necessary electrical power to operate the sump pump. This power source 131 can be connected to a primary or backup power supply (e.g., a battery) to ensure continuous operation during power outages. The control system 103 regulates the operational functions of the sump pump. It includes sensors and switches that detect fluid levels within the sump pump well, automatically activating the pump when the fluid reaches a predetermined level and deactivating it when the fluid is sufficiently removed. In some cases, sump pumps can also be powered by fluid pressure, using the flow of the fluid to generate the necessary force to drive the pump. This type of system is less common but can be useful in areas where electricity is unreliable.

The discharge line 106 is a pipe or hose connected to the sump pump. The discharge line directs the pumped fluid away from the sump pump to a designated discharge point (e.g. a drainage system and/or an external location). The discharge line 106 ensures that fluid is effectively removed from the sump pump well and prevents flooding of the sump pump well. The check valve 107 is installed in the discharge line to allow fluid to flow in only one direction—from the sump pump to the discharge point—thereby preventing backflow of fluid into the sump pump well. This is crucial for maintaining the efficiency of the sump pump and preventing re-entry of discharged fluid.

Conventional sump pump systems 100 also typically include a buoyant device (i.e., a float 155) as a component of a control system (not illustrated) for the sump pump system 100. The float 155 is connected to a switch within the control system. As the fluid level in the sump pump well rises, the float 155 rises with it. When the float 155 reaches a certain height, it triggers the switch to activate the pump motor 102. The float 155 ensures that the sump pump system 100 operates only when necessary, preventing unnecessary wear on the pump and conserving power.

Figure 2:
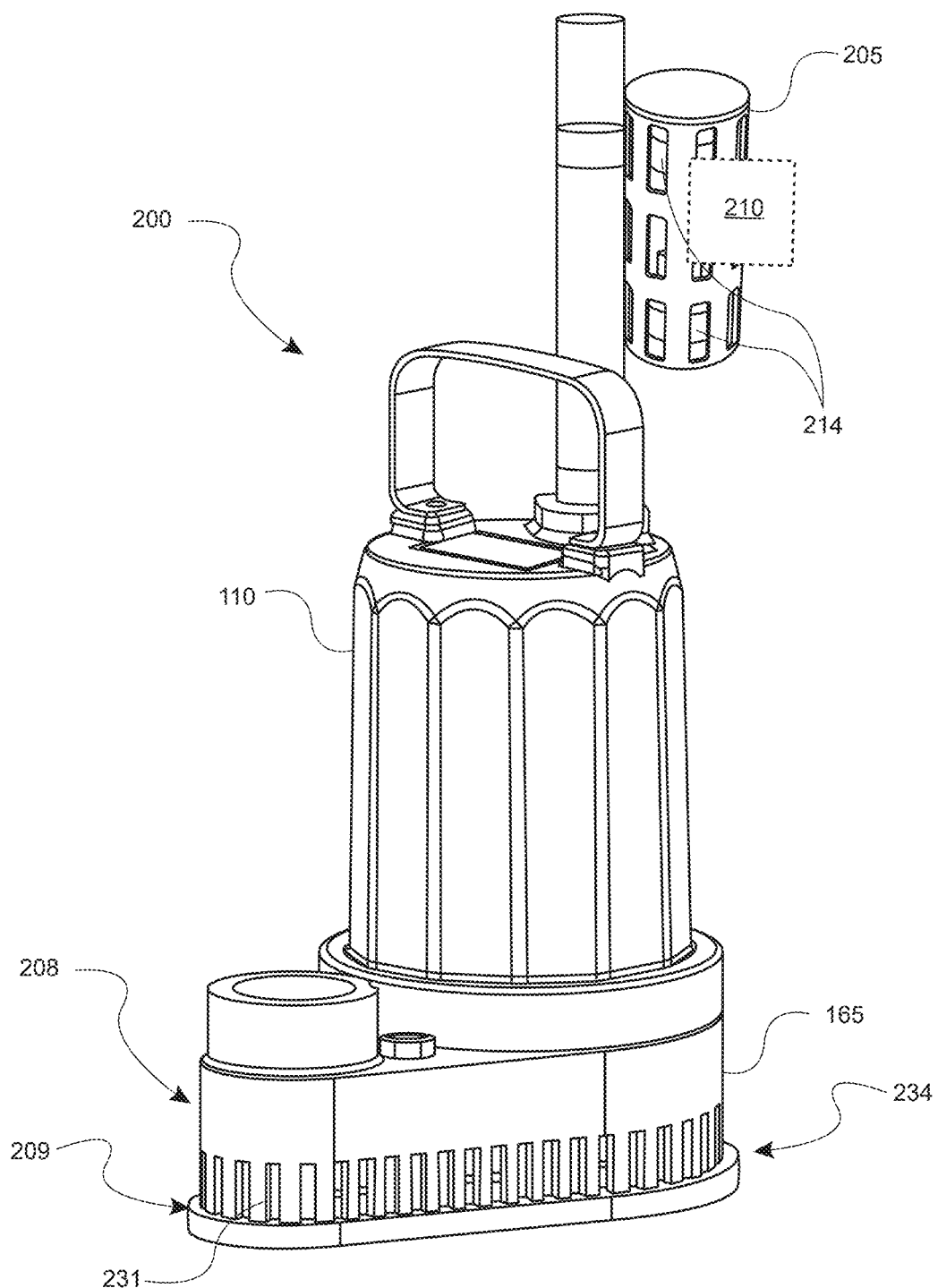
FIG. 2 is an illustration of a sump pump system with an illumination circuit, according to one example.

FIG. 2 is an illustration of a sump pump system 200 with an illumination circuit 210. As illustrated in FIG. 2, the sump pump system 200 has a housing 110 that includes a base 165 having an upper portion 208 and a lower portion 209. Each portion includes a plurality of teeth 230. The plurality of teeth 231 are designed to interlock with corresponding teeth on the sump pump housing 110, creating a filtering mechanism 234. The sump pump teeth 230 are designed to be mounted at the inlet of the sump pump system 200. The teeth on the upper portion 208 align with the teeth on the lower portion 209. When these components are assembled, the interlocking teeth form a barrier that filters out particulate matter. The interlocking teeth not only ensure a secure fit but also enhance the pump's efficiency by filtering out unwanted particles. This design ensures the sump pump system 200 operates reliably, effectively managing fluid levels and protecting the surrounding environment from fluid damage.

The sump pump system 200 further includes a float housing 205 that houses at least one float 214. The float housing 205 is typically attached to the discharge line 106 in proximity to the sump pump 200 to maintain that the float switch is submerged in a fluid when the well fills. The basket often features removable lids or access points for easy maintenance, facilitating inspections and repairs without disassembling the entire pump system.

As illustrated in FIG. 2, the illumination circuit 210 can be disposed within or adjacent to the float housing 205 (e.g., the illumination circuit 210 can be disposed inside of the float housing 205 such that the exterior of the float housing 205 completely surrounds the illumination circuit 201). Given that the illumination circuit 210 is submerged in a fluid, the illumination circuit 210 disclosed herein is encased in a fluid proof housing (e.g., a waterproof body). The waterproof body is constructed to prevent fluid from coming into contact with the internal components of the illumination circuit 210, which is essential for reliable operation within the sump pump well environment. In one example, the waterproof body is made from water resistant materials like plastic and rubber.

The illumination circuit 210 is designed to be coupled to the float housing. This coupling is achieved through mechanical or electrical connectors that securely attach the illumination circuit to the float housing. The float housing 205 is a component that holds and positions the float switches and other related elements within the sump pump system 200. The coupling allows the illumination circuit to function in conjunction with the float housing, ensuring that the lighting system operates correctly based on the float switches' status.

The illumination circuit 210 is powered by an electrical connection that can be integrated into the sump pump's existing power source 131, utilizing the same source of electricity that powers the internal components 114. Alternatively, the illumination circuit 210 can be powered by a separate power source, such as a battery, to ensure that the lighting function remains operational even if the primary power supply fails. A user can rely on the light provided by the illumination circuit 210 to inspect and perform maintenance tasks on the sump pump system 200 without the need for additional external lighting devices. The illumination circuit 210 thus enhances the usability and convenience of the sump pump system 210 by providing built-in lighting for a sump pump well.

Figure 3:
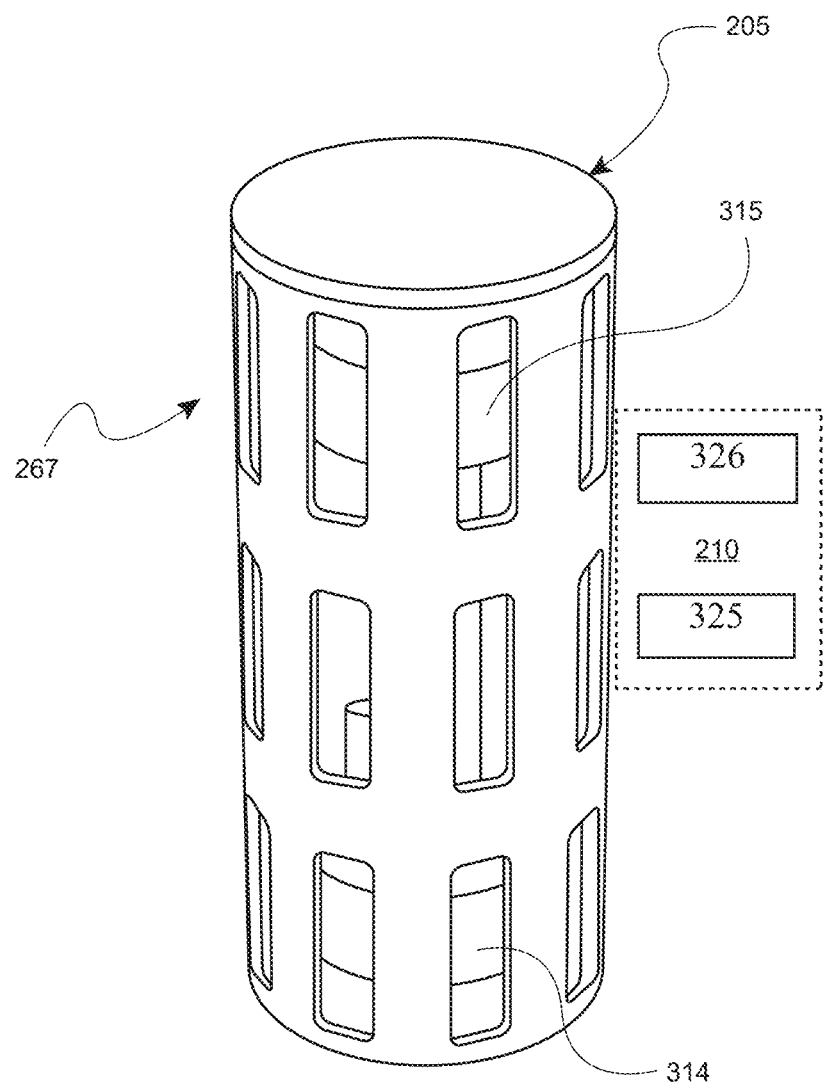
FIG. 3 is an illustration of a float housing, according to one example.

FIG. 3 is an illustration of the float housing 205 enclosing a switch assembly 267. The switch assembly 276 includes a first float switch 314 disposed at a first end and second float switch 315 disposed at a second end. As illustrated in FIG. 3, The first float switch 214 is coupled to the float housing and disposed at the first end. The first float switch is configured to activate the sump pump 102 in response to the sump pump well being filled with the fluid. The second float switch 315 is coupled to the float housing and disposed at the second end. The second float switch is configured to provide a redundant electrical switch to ensure operation of the impeller in response to the sump pump well being filled with the fluid.

In one example, the first float switch 314 and second float 315 are components of the illumination circuit 210. For example, in one embodiment, the illumination circuit 210 includes a first light source 325 communicatively coupled to the first float 314 and a second light source 326 communicatively coupled to the second float 315. The first light source 325 is activated when the sump pump is operational, indicating that the pump is working. The second light 326 source is active when the pump has failed to operate, indicating that the pump is not working.

The first light source 325 is positioned to illuminate the interior of the sump pump well, allowing the user to see the pump and its components clearly. This facilitates inspection and maintenance by providing adequate lighting within the well. The second light source 326 is activated when the sump pump is not operational, indicating that the pump is not working. The second light source 326 also illuminates the interior of the sump pump well, providing visibility to the user when the pump is not functioning.

The first light source 325 and second light source 326 can be integrated into the sump pump's existing power supply, utilizing the same source of electricity that powers the pump mechanism. Alternatively, the first light source 325 and second light source 326 can be powered by a separate power source, such as batteries, to ensure that the lighting function remains operational even if the primary power supply fails.

Figure 4:
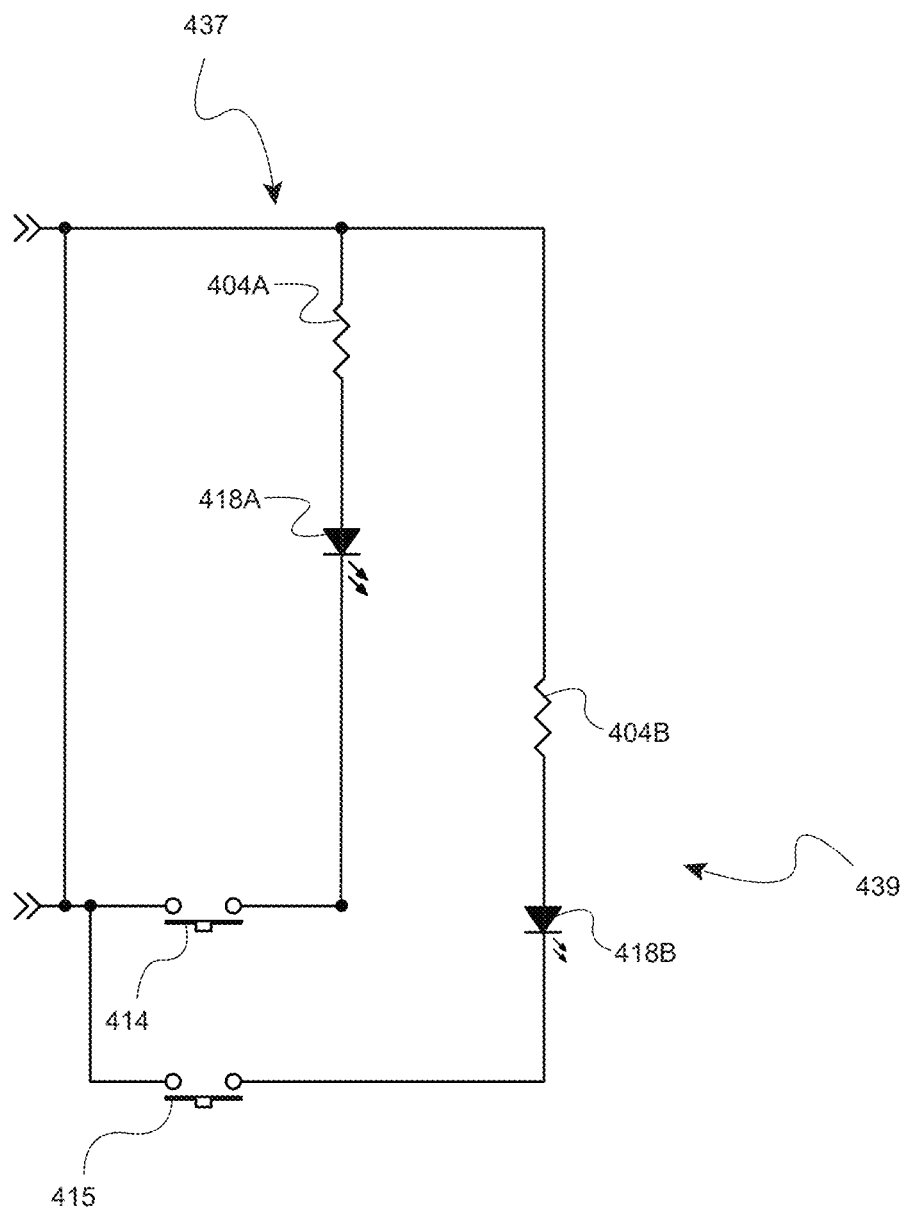
FIG. 4 is a schematic illustration of an illumination circuit, according to one example.

FIG. 4 is a schematic illustration of an illumination circuit 210, according to one example. The illumination circuit 210 is configured to emit light from a first light source 324 when the first float switch 314 is closed and emit light from a second light source 325 when the second float switch 315 is closed. The first light source 324 and the second light source 325 can be operated independently via two sub-circuits (i.e., a first sub-circuit 437 and a second sub-circuit 439) each sub-circuit being responsible for operating a respective light source in response to a float switch being closed by a rising fluid level in a sump pump well. For example, when the first float switch 314 is closed, a first light emitting diode 418A is configured to illuminate a wall of the sump pump well. When the second float switch 315 is closed, a second light emitting diode 418B is configured to illuminate the wall of the sump pump well. The first light emitting diode 418A and second light emitting diode 418B can thus be used to indicate a status of the sump pump system 200 to a user peering into the sump pump well. Unlike conventional control devices (e.g., processors) that switch between the first and second light sources based on the operational status of devices, the illumination circuit 210 herein can switch between the first light source 324 and second light source 325 without the need for a processor, thereby providing a visual indication to the user the operation of the sump pump system 200 without the need for an intricate control system.

As seen in FIG. 4, the simplified illumination circuit 210 includes first sub-circuit 437 includes a first light emitting diode 418A communicatively coupled to the first float switch 414. The first float switch being communicatively coupled to the first float 314. The first sub-circuit 437 includes a resistor 404 to regulate current and voltage within the first sub-circuit 437 when the first float switch 414 is activated. In one example, the first light emitting diode 418A is positioned in parallel with the first float switch 314 such that the activation of the first float 414 switch directly triggers the first light emitting diode 418A.

The second sub-circuit 439 includes a second light emitting diode 418B communicatively coupled to the second float 315. The second float 315 is communicatively coupled to the second float switch 415. The second sub-circuit 439, like the first sub-circuit 437, includes a resistor 404B for controlling voltage and current through the second light emitting diode 418B. As seen further in FIG. 4, the second light emitting diode 418B is positioned in parallel with the second float switch 415, thereby ensuring that when the second float switch 415 is in a closed position, the electrical circuit is completed and the second light emitting diode 418B is illuminated.

In one example, the second float switch 415 operates as a redundant float switch to ensure proper operation of the sump pump. When the fluid level reaches the point where the second float 415 switch closes, it activates the second light emitting diode 418B, providing illumination to the sump pump well. In this example, the second float switch 415 is communicatively coupled to the second float 315 disposed in the float housing at a position different from the first float 314 (e.g., the first float 314 is disposed at a first position and the second float 315 is disposed at a second position different from the first position). This second location corresponds to a different fluid level in the sump pump well from the first location.

In this example, the first light emitting diode 418A is a different color than the second light emitting diode 418B. The parallel arrangement of float switches 414, 415 with their respective light emitting diodes 418A and 418B allows each light emitting diode to operate independently based on the closure of its associated float switch. When the first float switch 414 closes, it completes the circuit for the first light emitting diode 418A. The voltage supplied to the light emitting diode 418A is controlled by resistor 404A and power supply within the illumination circuit 210 which is continuously supplied to the illumination circuit 210 when at least one switch is closed. Thus, if the first float switch 414 fails to close, as long as the second float switch 415 closes, completing the circuit for the second light emitting diode 415, the sump pump well will be illuminated indicating to a user that the first float switch 414 failed to close.

In one example, the electrical components (e.g., resistors 404, diodes 418, wires, etc.) of illumination circuit 210 are insulated and/or routed within the waterproof body to protect against fluid damage. In one example, the first light emitting diode 418 and second light emitting diode 418 are disposed within the waterproof body. This waterproof body can be attached to the float housing 205 or alternatively attached the sump pump housing 110. For the purposes of this disclosure, "attaching" the waterproof body includes adhering, disposing adjacent to, connecting, the waterproof body to either the housing 110 or the discharge line of the sump pump system 200. The term "attaching" should not be read to limit the location of the illumination circuit 210 or the waterproof body that can optionally be used to protect the circuit from water egress if it is disposed in a location that is exposed to a fluid. In one example, the waterproof body of the illumination circuit 210 is equipped with mounting points or brackets to secure it to the float housing 205 or sump pump housing 110. These mounting features are designed to ensure that the illumination circuit 210 remains in a fixed position maintaining its alignment relative to the float housing 205 or pump housing.

Float switches 414, 415, light emitting diodes 418A, 418B, and resistors 404A, 40B each operate within defined voltage ranges. The first float switch 415 and the second float switch 415 are designed to operate with the voltage supplied to the sump pump system 200. For example, float switches 414 and 415 can be float switches that are rated for operation with standard voltages such as 120 volts AC or 240 volts AC, depending on the system configuration. The light emitting diodes 418A, 418B and their respective sub-circuits, are designed to operate at lower voltages. The light emitting diodes 418A, 418B generally operate at voltages in the range of 2 to 3 volts DC per diode. In an example where the system operates at 240 volts AC, the illumination circuit 210 includes a step-down transformer to step down the voltage to a level that is compatible with the light emitting diodes.

Figure 5:
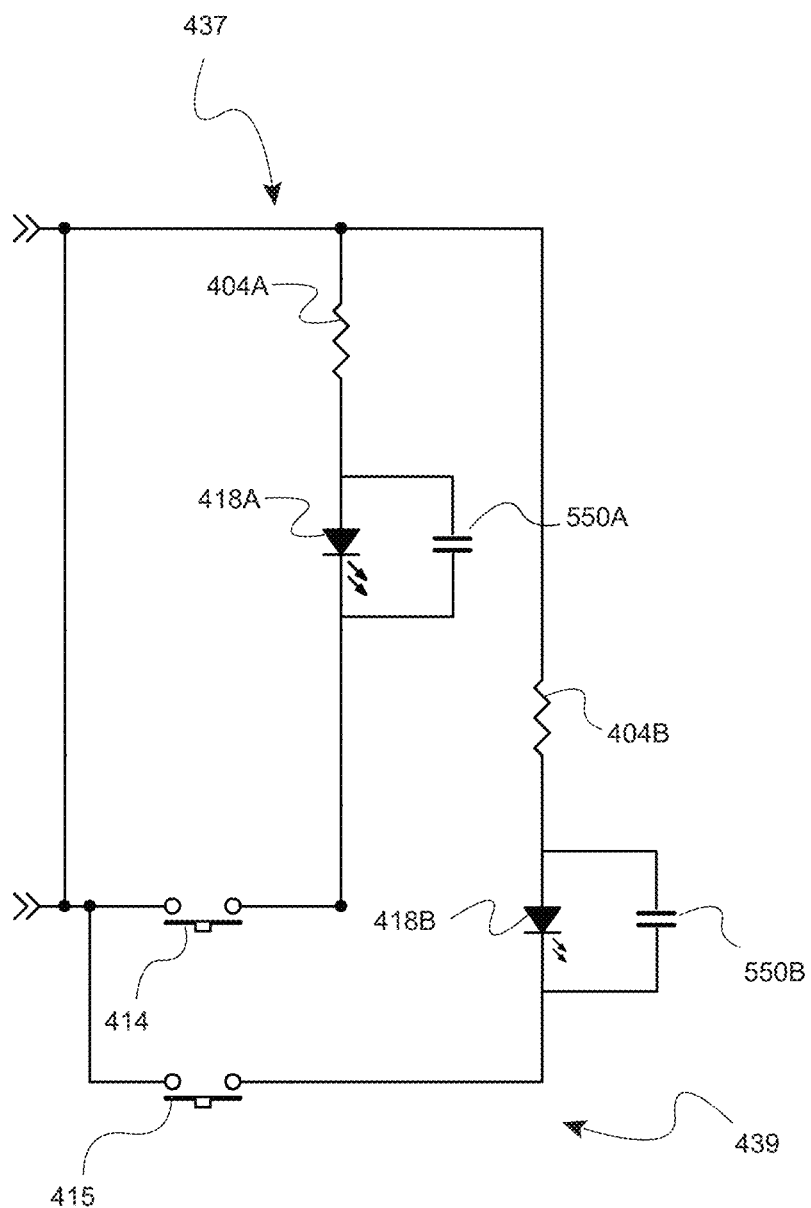
FIG. 5 is an illustration of an alternative illumination circuit, according to one example.

FIG. 5 is an illustration of an alternative illumination circuit 210, according to one example. This example illumination circuit 210 includes a plurality of capacitors 550A, 550B for storing and releasing power to the plurality of light emitting diodes 418A, 418B. By connecting the capacitors to a voltage source, each capacitor can be charged up to a supply voltage at a rate determined by resistor values. In doing so, the plurality of capacitors 550A, 550B can pulse the illumination generated by each light emitting diode 418A, 418B respectively. For example, by coupling a first terminal of capacitor 550A with a terminal resistor 404A and the anode of light emitting diode 418A and coupling a second terminal of capacitor 550A with the cathode of light emitting diode 418A, the illumination generated by light emitting diode 418A can be altered (e.g., pulsed). In addition, by coupling a first terminal of capacitor 550B with a terminal of resistor 404B and the anode of light emitting diode 418B and coupling a second terminal of capacitor 550B with the cathode of light emitting diode 418B, the illumination generated by light emitting diode 418B can be altered. Although not illustrated, like the illumination circuit 210 in FIG. 4, this example illumination circuit 210 can also include different colors of light emitting diodes 418, thus signaling to a user via color or pulse information regarding the operation of the sump pump system 200.

Figure 6:
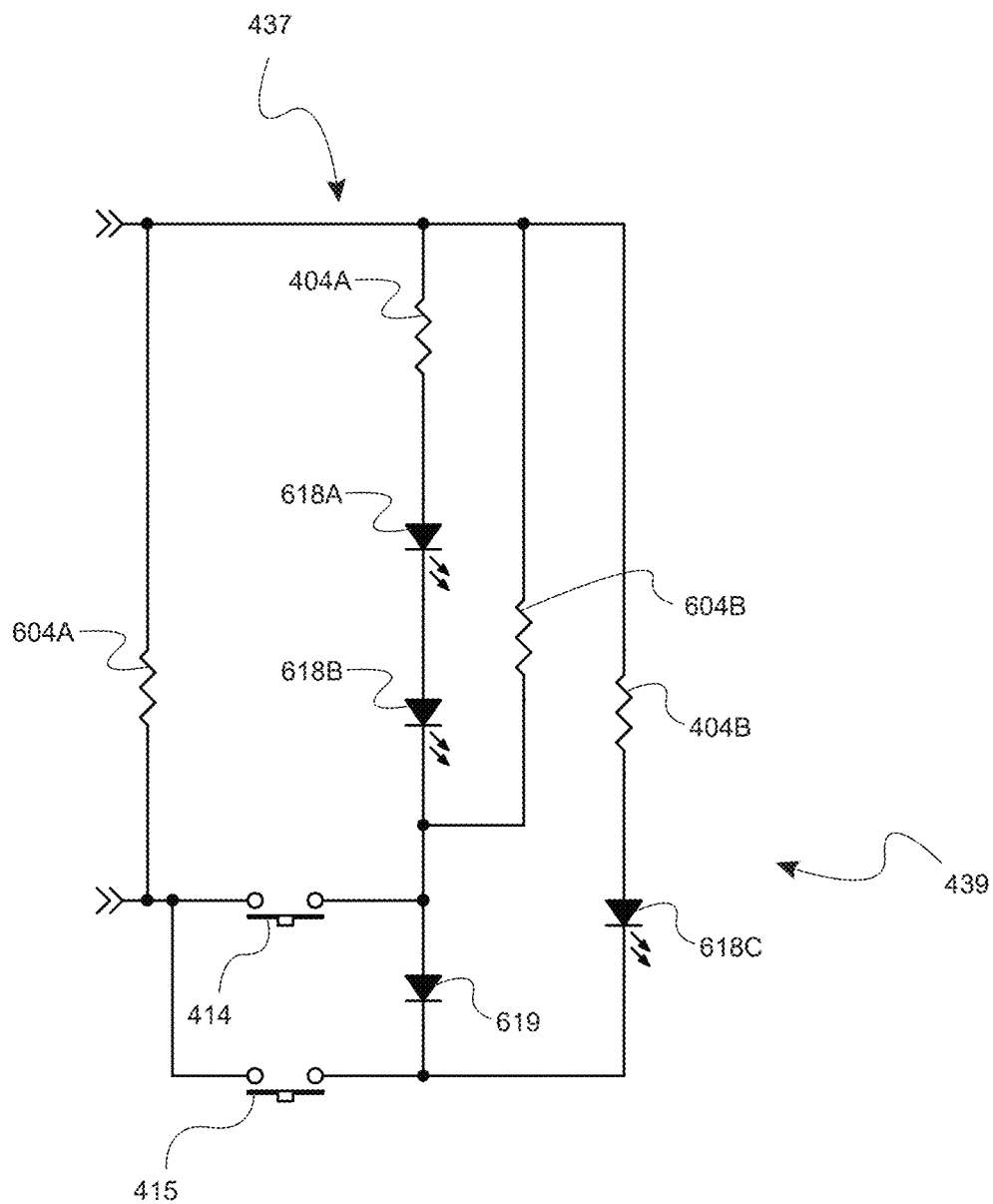
FIG. 6 is an illustration of an alternative illumination circuit, according to one example.

FIG. 6 is an illustration of an alternative illumination circuit 210, according to one example. In this example, illumination circuit 210 includes the first sub-circuit 437 comprising two light emitting diodes 618A, 618B configured to illuminate a wall of the sump pump well in response to the first float switch 414 being closed. In this configuration, light emitting diodes 618A and 618B are coupled in series. The anode of light emitting diode 618A is connected in series with a terminal of resistor 404A. The cathode of light emitting diode 618B is connected in parallel with a terminal of resistor 604B. The illumination circuit 210 further includes the second sub-circuit 439 comprising a single light emitting diode 618C. As seen in FIG. 5, the anode of light emitting diode 618C is coupled to a terminal of resistor 404B, and the cathode of light emitting diode 618C is coupled in parallel to switch 415 and a cathode of diode 619. In this example, diode 619 is standard diode which allows current to flow in only one direction thereby protecting the circuit from reverse voltage or current.

The illumination circuit 210 is configured to emit light from both light emitting diodes 618A, and 618B when the first float switch 314 is closed and emit light from light emitting diode 618C when the second float switch 315 is closed. Similar to the circuits in FIGS. 4 and 5, each sub-circuit 437 and 439 can work independently, thus visually signaling to a user an indication of whether the first float 314 or second float 315 is operating. In doing so, the illumination circuit 210 can also provide illumination to the sump pump well so that a user can visually inspect the status of the sump pump well to determine whether fluid and/or contaminants are present in the sump pump well.

Figure 7:
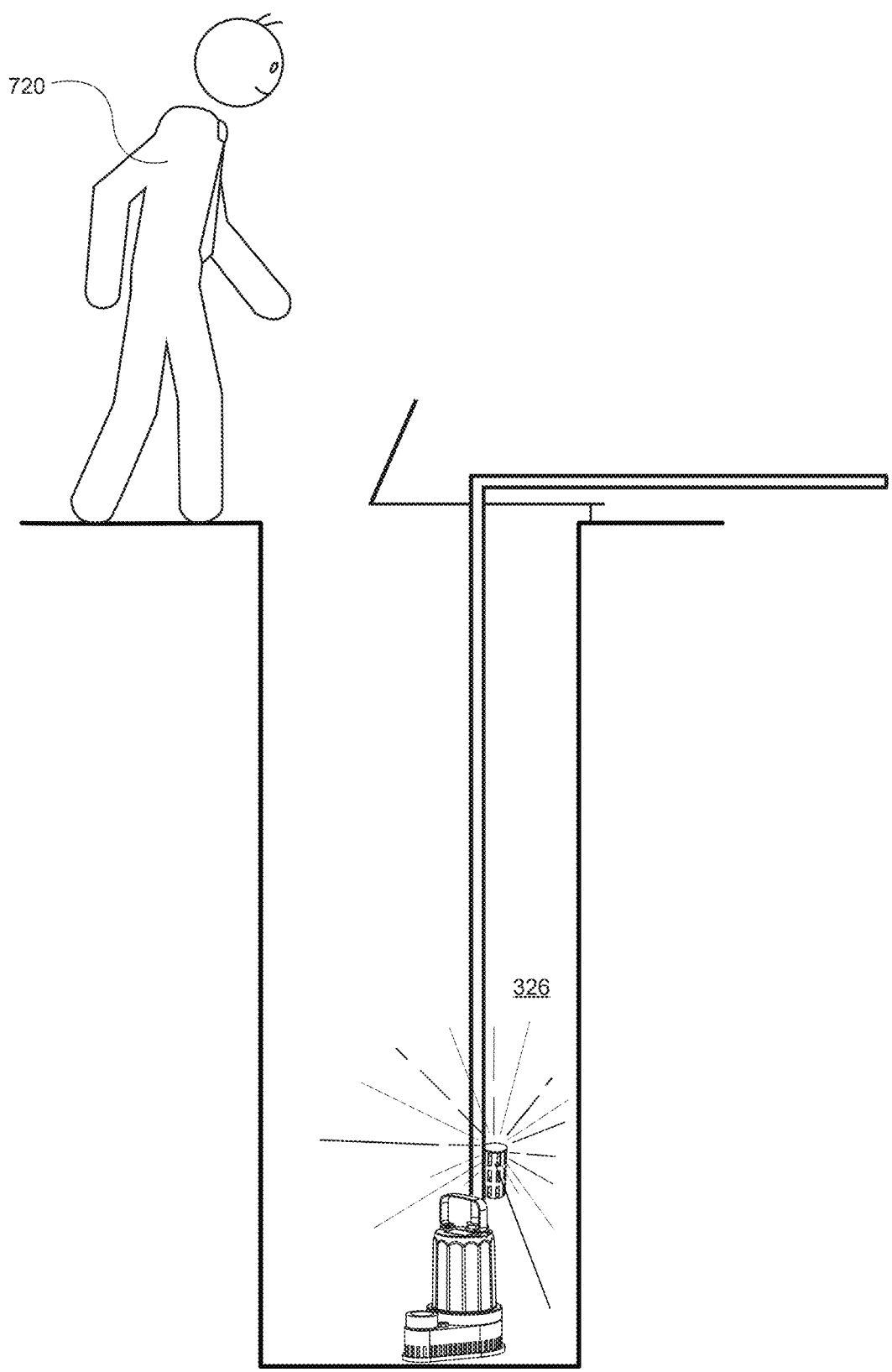
FIG. 7 is an illustration of an environment in which the sump pump system is disposed, according to one example.

FIG. 7 is an illustration of an environment of the sump pump system 200, according to one example. As seen in FIG. 7, the sump pump system 200 is disposed at the bottom of the sump pump well in a fixed position to manage fluid accumulation. In this example, the second light source 326 is illuminated indicating to the user that the first float 314 is not working. When the sump pump system 200 is operational and the first float 314 is activated thereby closing the first switch 414, the first light source 326 should be activated. Because the first light source 325 is not activated, the user can conclude that there is a problem with the sump pump. However, because the second light source 326 is activated the user can conclude that the sump pump system 200 is working. The user can thus use the visual indicators provided by the illumination circuit 210 to determine the operational status of the sump pump system 200.

Figure 8:
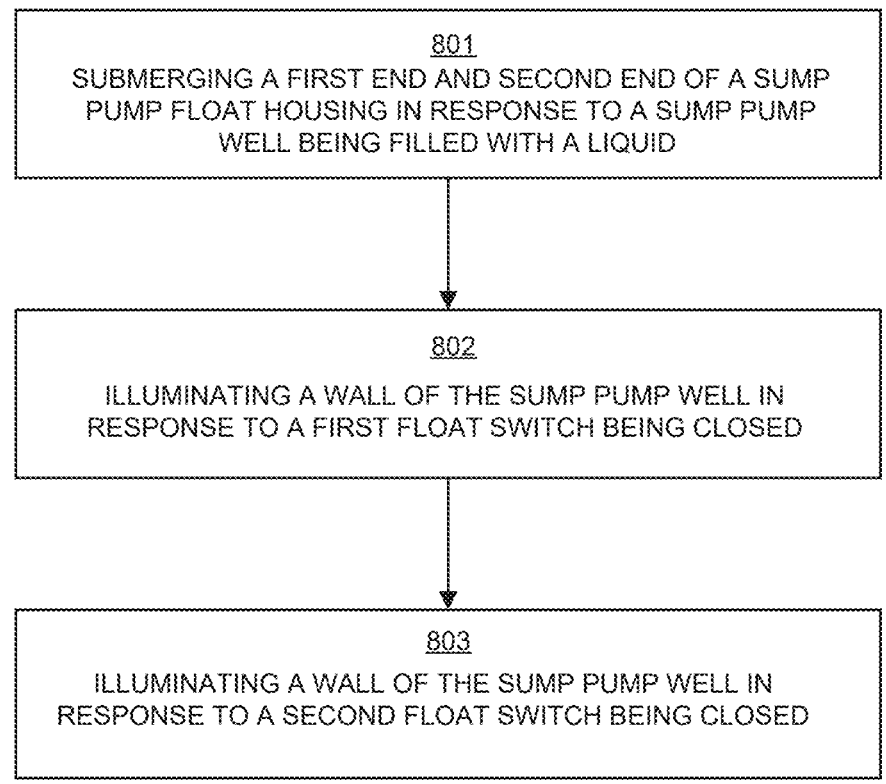
FIG. 8 is an illustration of a method of visually indicating the operational status of the sump pump system to a user, according to one example.

FIG. 8 is an illustration of a method 800 of visually indicating the operational status of the sump pump system to a user, according to one example. The method 800 includes submerging a first end and second end of a sump pump float housing 205 in response to a sump pump well being filled with a fluid; illuminating a wall of the sump pump well in response to a first float switch 414 being closed; and illuminating a wall of the sump pump well in response to a second float switch 415 being closed.

At step 801, the method 800 includes submerging the sump pump float housing 205 into a fluid in the sump pump well. As the level of the fluid within the well rises to a specific level, both a first float 314 and second float 315 disposed within a float housing 205 are submerged indicating the presence of a fluid at or above a designated level for fluid removal.

At step 802, the method 800 includes illuminating a wall of the sump pump well in response to the first float switch 414 being closed. As the fluid level in the sump pump well rises, it causes the first float switch 414, which is coupled to the first float 314, disposed at the float housing 205, at the first end, to close. The closing of this first float switch 414 completes an electrical circuit (i.e., the first sub-circuit 437) that triggers light emitting diode 418A to illuminate. This visual indication signals to a user viewing the sump pump system 200 that a fluid has reached the level of the first float 314 and that the sump pump system 200 is in operation to remove a fluid from the sump pump well.

At step 803, the method 800 includes illuminating the wall of the sump pump well in response to the second float switch 415 being closed. Unlike the first float 314, the second float 315 is disposed at a second end of the float housing 205. When the fluid level within the sump pump well rises to a height that activates the second float switch 415, the switch closes, completing the second sub-circuit 439 and trigger light emitting diode 418B to illuminate the sump pump well. Like the visual indication in step 802, this step provides the user with additional visual feedback about the fluid level and the status of the sump pump system (e.g., that the fluid level in the sump pump well has risen to the level of the second float 315). In this example, the user may determine that operation of the sump pump system 200 should be altered to increase removal of fluid from the sump pump well.

Figure 9:
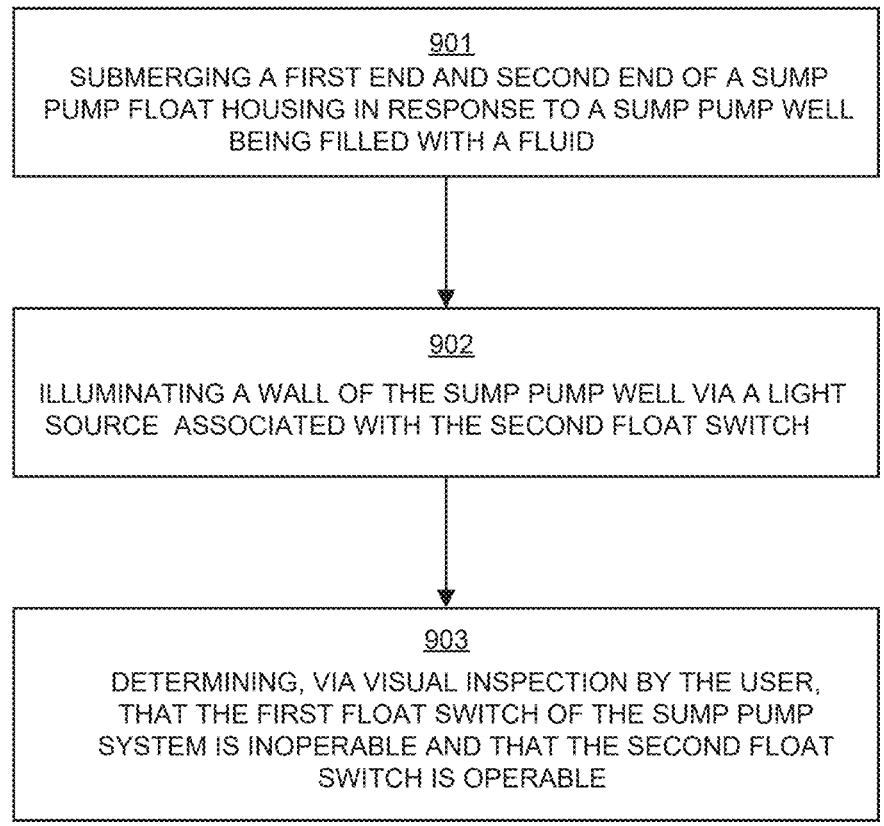
FIG. 9 is an illustration of an alternative method of visually indicating the operational status of the sump pump system to a user, according to one example.

FIG. 9 is an illustration of an alternative method 900 of visually indicating the operational status of the sump pump system to a user, according to one example. The method 900 includes submerging a first end and second end of a sump pump float housing in response to a sump pump well being filled with a fluid; illuminating a wall of the sump pump well via a light source associated with the second float switch; and determining, via a visual inspection by the user, that the first float switch of the sump pump system is inoperable and that the second float switch is operable.

At step 901, the method 900 includes submerging the first end and second end of the sump pump float housing in response to a sump pump well being filled with a fluid. Like step 801, as the level of the fluid within the well rises to a specific level, both a first float 314 and second float 315 disposed within a float housing 205 are submerged indicating the presence of a fluid at or above a designated level for fluid removal.

At step 902, the method 900 includes illuminating a wall of the sump pump well via a light source associated with the second float switch. As the fluid level in the sump pump well rises, it should cause the first float switch 414 to close thereby completing an electrical circuit (i.e., the first sub-circuit 437) and triggering light emitting diode 418A to illuminate. However, if the first float switch 414 fails to close, light emitting diode 418A will not illuminate. In this example scenario, the sump pump system 200 would not engage until the fluid level has reached the second float 315. Upon the fluid level rising to a height that activates the second float switch 415, the switch closes, completing the second sub-circuit 439 and triggering light emitting diode 418B to illuminate the sump pump well. Thus, at this step only a single light source is illuminated. In one example, the second light source includes a color unique from the first light source 325 to indicate to the user that the second float switch 415 is activated.

At step 903, the method 900 includes visually inspecting the sump pump well, by a user, to determine that the first float switch of the sump pump system is inoperable and that the second float switch is operable. Here, upon physically inspecting the well, the user is able to observe that the sump pump system 200 has triggered only the second float switch 415. By knowing that the first float switch 414 is configured to close and trigger a light source associated with the first float switch 414 when a fluid fills the sump pump well and submerges the first float 314, the user is able to determine that the first float switch 414 is inoperable. Because the user is only able to visually observe a light associated with the second float switch 415, the user can conclude that the second float switch 415 is operable and the first float switch is inoperable. Like the visual indication in steps 802 and 803, this step provides the user with additional visual feedback about the fluid level and the status of the sump pump system (e.g., that the fluid level in the sump pump well has risen to the level of the second float 315). Like step 803, the user may determine that operation of the sump pump system 200 should be altered to increase removal of fluid from the sump pump well.

What is claimed is:

1. A sump pump system for illuminating a sump pump well, the sump pump system comprising:
    a sump pump switch assembly including:
        a float housing having a first end and second end, the float housing configured to be coupled to a sump pump drainpipe at a position sufficient to submerge the first end and second end of the float housing in a fluid in response to the sump pump well being filled with the fluid;
        a first float switch coupled to the float housing and disposed at the first end, the first float switch configured to activate an impeller of a sump pump in response to the sump pump well being filled with the fluid; and
        a second float switch coupled to the float housing and disposed at the second end, the second float switch configured to provide a redundant electrical switch to ensure operation of the impeller in response to the sump pump well being filled with the fluid; and
        an illumination circuit encased in a waterproof body and configured to be coupled to the float housing, the illumination circuit including:
            a first illumination sub-circuit including:

a first light emitting diode configured to illuminate a wall of the sump pump well in response to the first float switch being closed, wherein the first light emitting diode is disposed in parallel with the first float switch; and a second illumination sub-circuit including:

a second light emitting diode configured to illuminate the wall of the sump pump well in response to the second float switch being closed, wherein the second light emitting diode is disposed in parallel to the second float switch.

2. The sump pump system for illuminating the sump pump well of claim 1, further comprising: a controller configured to measure a load across the illumination circuit to determine that the first float switch or that the second float switch is in a closed position.

3. The sump pump system for illuminating the sump pump well of claim 2, wherein the controller is configured to use a voltage differential between the first illumination sub-circuit and second illumination sub-circuit to determine that the first float switch is in a closed position, and wherein the controller is configured to use a voltage differential between the first illumination sub-circuit and second illumination sub-circuit to determine that the second float switch is in a closed position.

4. The sump pump system for illuminating the sump pump well of claim 1, wherein the first light emitting diode is configured to visually indicate to a viewer of the sump pump system that the first float switch is closed, and wherein the second light emitting diode is configured to visually indicate to a viewer of the sump pump system that the second float switch it closed.

5. The sump pump system for illuminating the sump pump well of claim 1, wherein the float housing is a basket type housing.

6. A method for visually indicating the operational status of a sump pump system to a user, the method comprising:

submerging a float housing of the sump pump system in a fluid in response to a sump pump well being filled with the fluid, the float housing encasing a first float disposed at a first end of the float housing and a second float disposed at a second end of the float housing;

illuminating a wall of the sump pump well in response to a first float switch being closed, the first float switch being coupled to the first float and closed when the first float is submerged in the fluid; and illuminating the wall of the sump pump well in response to a second float switch being closed, the second float switch being coupled to the second float and closed when the second float is submerged in the fluid.

7. A method for visually indicating the operational status of a sump pump system to a user, the method comprising:

submerging a float housing of the sump pump system in response to a sump pump well being filled with a fluid to a predetermined level, the float housing having a first float coupled to a first float switch disposed at a first end of the float housing and a second float coupled to a second float switch disposed at a second end of the float housing;

illuminating a wall of the sump pump well via a second light source coupled to the second float switch, the second light source being activated by the fluid reaching the predetermined level;

determining, via a visual inspection by the user, that the first float switch of the sump pump system is inoperable; and determining, via the visual inspection by the user, that the second float switch of the sump pump system is operable.

* * * * *